US00RE46215E

(19) United States
(12) Reissued Patent
Gotoh

(10) Patent Number: US RE46,215 E
(45) Date of Reissued Patent: Nov. 22, 2016

(54) COMPUTING MACHINE WITH AN INEQUALITY COMPUTATION FUNCTION

(71) Applicant: CASIO COMPUTER CO., LTD., Tokyo (JP)

(72) Inventor: Fumio Gotoh, Tokyo (JP)

(73) Assignee: CASIO COMPUTER CO., LTD., Tokyo (JP)

(21) Appl. No.: 14/566,259

(22) Filed: Dec. 10, 2014

Related U.S. Patent Documents

Reissue of:
(64) Patent No.: 8,332,445
Issued: Dec. 11, 2012
Appl. No.: 12/185,432
Filed: Aug. 4, 2008

(30) Foreign Application Priority Data

Aug. 31, 2007 (JP) ..... 2007-226144

(51) Int. Cl.
*G06F 3/00* (2006.01)
*G06F 15/16* (2006.01)
*G06F 15/02* (2006.01)

(52) U.S. Cl.
CPC ..... *G06F 15/16* (2013.01); *G06F 15/02* (2013.01)

(58) Field of Classification Search
CPC .... G06F 15/16; G06F 15/02; G06F 15/0275; G06T 11/206
USPC ..... 708/171, 130, 145; 345/440, 160, 158; 715/856
See application file for complete search history.

(56) References Cited

U.S. PATENT DOCUMENTS 5,739,823 A * 4/1998 Akaza et al. ..... 345/440
6,549,923 B1 * 4/2003 Sudoh ..... 708/162
6,771,252 B2 * 8/2004 Miller ..... G06T 11/206 345/158
6,867,777 B2 * 3/2005 Miller ..... G06F 15/0275 345/440
2002/0075265 A1 * 6/2002 Miller et al. ..... 345/440
2002/0078107 A1 * 6/2002 Miller et al. ..... G06F 15/0275 708/131
2006/0024649 A1 * 2/2006 Vernon ..... G09B 19/025 434/201

FOREIGN PATENT DOCUMENTS

JP 8-180197 A 7/1996
JP 2000-242801 A 9/2000

* cited by examiner

*Primary Examiner* — Majid A Banankhah
(74) *Attorney, Agent, or Firm* — Holtz, Holtz & Volek PC

(57) ABSTRACT

When an arithmetic operation is performed on an inequality, a solution notation pattern composed of a combination of a symbol and an inequality sign symbol is determined on the basis of an expression, a solution, and an inequality sign symbol. With Line I/O being set as the calculation result display mode, the solution notation pattern data, for example, [A≤X≤B], is displayed in the upper part of a display unit. The values of the solutions [X1] [X2] corresponding to the symbols [A] [B] shown in the pattern data are displayed as [A=X1] [B=X2] in the lower part of the display unit. This makes it possible to display the solution of the inequality in an easy-to-understand manner.

22 Claims, 8 Drawing Sheets

(INEQUALITY SELECT SCREEN)

(INEQUALITY SIGN SELECT SCREEN)

(COEFFICIENT INPUT SCREEN)

COMPUTING MACHINE WITH AN INEQUALITY COMPUTATION FUNCTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based upon and claims the benefit of priority from prior Japanese Patent Application No. 2007-226144, filed Aug. 31, 2007, the entire contents of which are incorporated herein by reference.

BACKGROUND OF THE INVENTION

1. Field of the Invention

This invention relates to a computing machine (or calculator) with an inequality computation and display function.

2. Description of the Related Art

One of the conventional electronic computing machines which have an inequality computation and display function is a graphical function calculator which has a graphical display function according to a desired function expression.

For example, with the graph function calculator described in Jpn. Pat. Appln. KOKAI Publication No. 08-180197, when the inequality $Y>f(X)$ is input, a locus of a graph corresponding to $Y=f(X)$ is drawn and displayed and further the range of solutions corresponding to the inequality is displayed in the form of a hatched area or a painted area to distinguish the range from the remaining area.

Furthermore, as described in Jpn. Pat. Appln. KOKAI Publication No. 2000-242801, an inequality processing device has been considered which displays on a number line graph the range of solutions corresponding to the input inequality.

The conventional graph function calculator has a large-screen display unit and can display a graph and represent the solutions of an inequality in graph form in an easy-to-understand manner. However, for example, a standard scientific electronic calculator with a display unit capable of displaying only about three lines of character strings cannot display a graph as described above and therefore has the problem of being incapable of representing an image of the solutions of an inequality in an easy-to-understand manner.

BRIEF SUMMARY OF THE INVENTION

According to an aspect of the invention, there is provided a computing machine comprising: inequality input means for inputting an inequality; inequality computation means for calculating a solution to an inequality input by the inequality input means; solution notation pattern determination means which, on the basis of the solution to the inequality calculated by the inequality computation means and an inequality sign symbol of the inequality, determines a solution notation pattern composed of a combination of a symbol and an inequality sign symbol; and solution display means which causes a display unit to display not only the solution notation pattern determined by the solution notation pattern determination means but also the value of the solution of the inequality calculated by the computation means corresponding to the symbol included in the displayed solution notation pattern.

According to the invention, for example, even a standard scientific electronic calculator without a large screen can display the solutions of an inequality in an easy-to-understand manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the invention will be explained.

Figure 1:
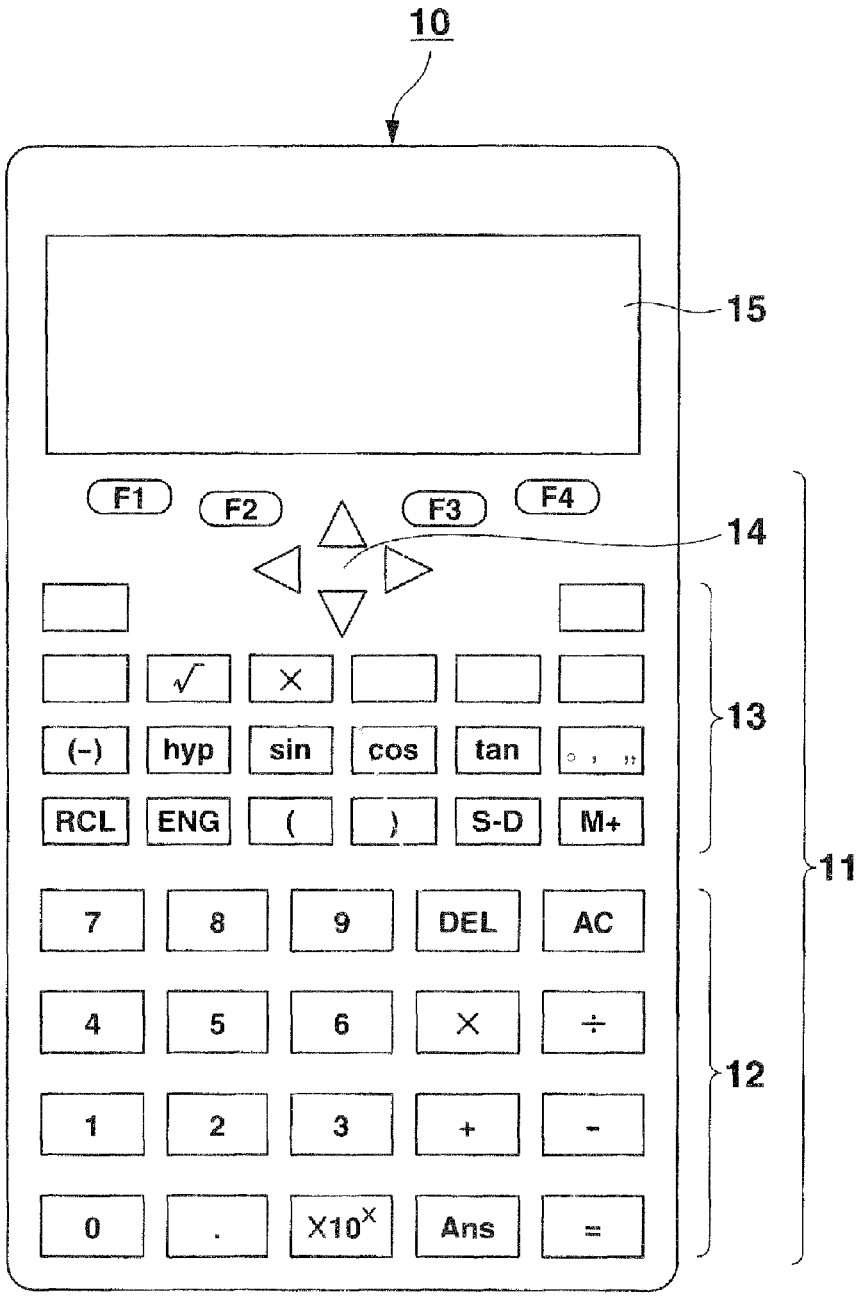
FIG. 1 is a front view showing the appearance of a scientific electronic calculator 10 according to an embodiment of a computing machine with an inequality computation function of the invention.

FIG. 1 is a front view showing the appearance of a scientific electronic calculator 10 according to an embodiment of a computing machine with an inequality computation function of the invention.

The scientific electronic calculator 10 is a small-sized calculator which enables the user to hold and operate it with one hand under the necessity for portability. On the front of the scientific electronic calculator 10, a key input unit 11 and a display unit 15 are provided.

The key input unit 11 includes a numeric-operation symbol key group 12 for inputting numbers and various operation symbols, a function key group 13 for setting up various functions and a memory function, cursor keys 14 for moving a cursor CU displayed on the display unit 15 or selecting data items on the display unit, and function keys F1 to F4 for selectively specifying various functions displayed in menu form along the lower end of the display unit 15.

The display unit 15, which is composed of a dot-matrix liquid-crystal display unit, has an area capable of displaying three lines of character strings in the scientific electronic calculator 10 of the embodiment.

Figure 2:
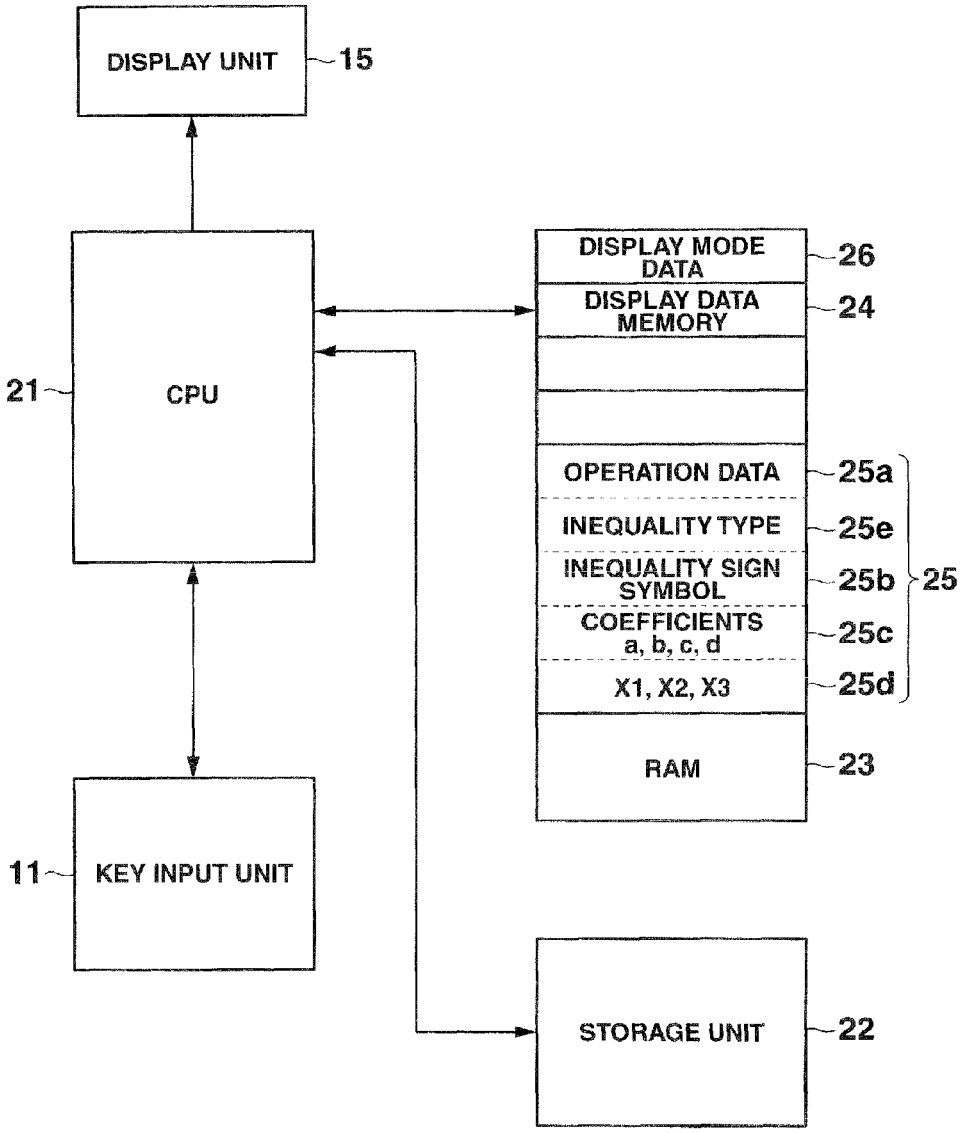
FIG. 2 is a block diagram of the electronic circuit of the scientific electronic calculator 10.

FIG. 2 is a block diagram showing a configuration of the electronic circuit of the scientific electronic calculator 10.

The electronic circuit of the electronic calculator 10 includes a CPU 21, a computer.

The CPU 21 controls the operation of various sections of the circuit according to a calculator control program previously stored in a storage unit 22, such as a ROM. Using a RAM 23 as a working memory, the CPU 21 executes various types of arithmetic processing according to a key input signal from a key input unit 11.

In the RAM 23, storage areas, including a display data memory 24, an arithmetic working memory 25, and a display mode data memory 26, are secured.

In the display data memory 24, data on a computation equation to be displayed on the display unit 15, data on the result of the computation, and the like are developed into up to three lines of bit map data corresponding to the display area of the display unit 15 and then are stored there.

Figure 4:
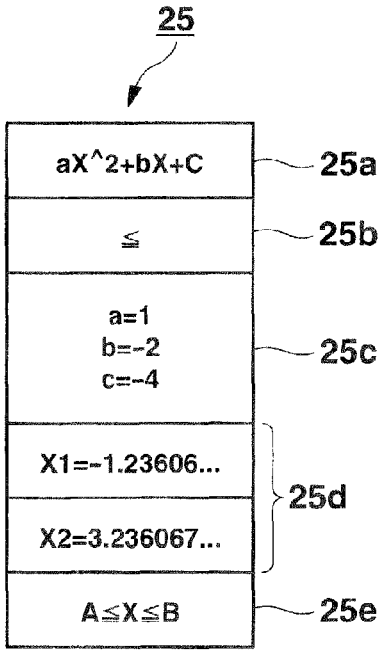
FIG. 4 is a diagram showing an example of data in an arithmetic working memory 25 when the scientific electronic calculator 10 performs an arithmetic operation on a quadratic inequality.

When an inequality is calculated, its computation equation data 25a, inequality sign symbol data 25b, coefficient data (a, b, c, d) 25c in the computation equation, solution data (X1, X2, X3) 25d, and inequality type data 25e showing the range of solutions on the basis of the inequality sign symbol are stored in the arithmetic working memory 25 (see FIG. 4).

The display mode data memory 26 stores display mode data which is set by the user operating a specific key and which indicates in what mode the calculation result is to be displayed. The display mode includes a mathematical natural display mode (Math I/O) and a calculator display mode (Line I/O). In an inequality computation process, the value of the solution of the inequality, the inequality sign symbol, and "X" are combined into one line and displayed in the mathematical natural display mode (Math I/O) (see FIG. 8). In the calculator display mode (Line I/O) the types of the inequality and the values of the solutions are displayed in such a manner that they are arranged in rows (see FIG. 10).

Figure 3:
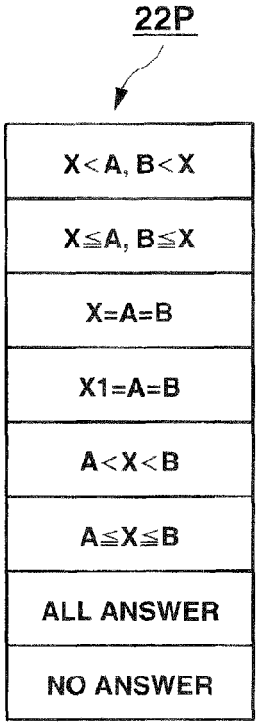
FIG. 3 is a diagram showing notation pattern data 22P about the solutions of a quadratic inequality stored in a storage unit 22 of the scientific electronic calculator 10.

FIG. 3 shows notation pattern data 22P on the solutions of a quadratic inequality incorporated in an inequality computation program stored in the storage unit 22 of the scientific electronic calculator 10.

The notation pattern data 22P on the solutions of a quadratic inequality shows all of the patterns representing the solutions of an inequality. [X<A, B<X] means that the range of solutions is less than A and greater than B. [X≤A, B≤X] means that the range of solutions is less than or equal to A and is greater than or equal to B. [X!=A=B] means that the solution is equal to A (=B). [X!=A=B] means that the solutions are equal to all excluding A (=B). [A<X<B] means that the range of solutions is greater than A and less than B. [A≤X≤B] means that the range of solutions is greater than or equal to A and is less than or equal to B. [All Answer] means that all are solutions. [No Answer] means that there is no solution.

As for a cubic inequality, notation pattern data on all solutions are incorporated in the inequality computation program as in the case of the quadratic inequality (22P).

The notation pattern data on these solutions is determined according to the inequality sign symbol data 25b, coefficient data (a, b, c, d) 25c, and solution data (X1, X2, X3) 25d stored the arithmetic working memory 25 (see FIG. 4) in the process of computation the inequality. The determined pattern data is stored as inequality type data 25e in the arithmetic working memory 25.

FIG. 4 shows the contents of data in the arithmetic working memory 25 in calculating a quadratic inequality at the scientific electronic calculator 10. Here, [$ax^2+bx+c$] 25a is data that means the calculation of a quadratic inequality, [≤] 25b is data that means the selected inequality sign symbol, and [a=1, b=−2, c=−4] 25c is data that means the individual items of coefficient data on a quadratic.

Next, the inequality computation function of the scientific electronic calculator 10 configured as described above will be explained using an example of calculating [$x^2-2x-4\leq 0$].

Figure 5:
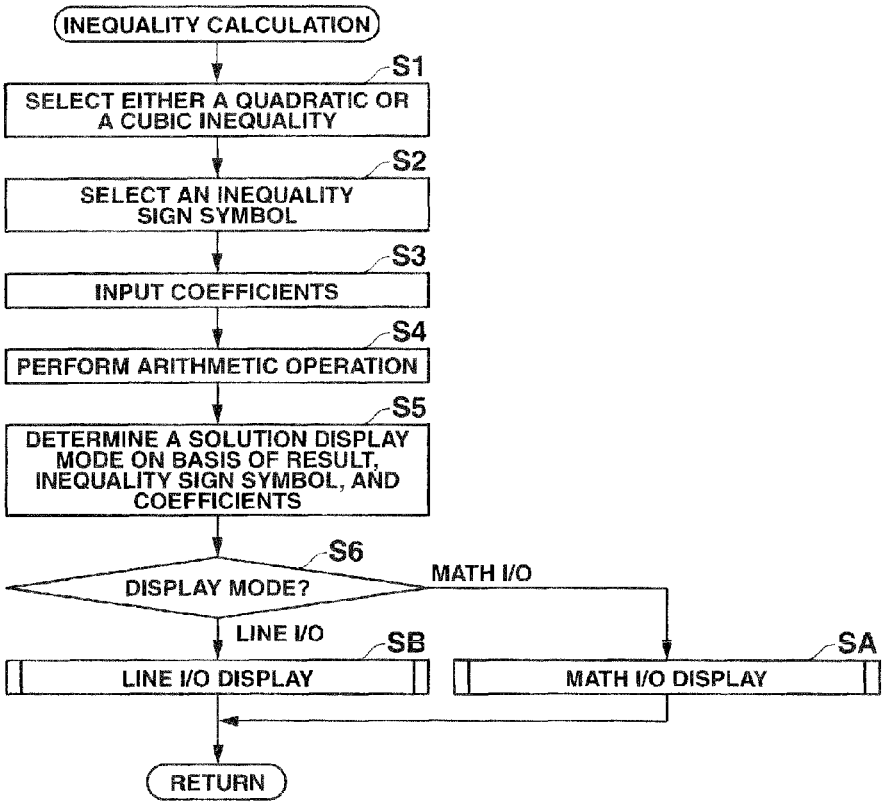
FIG. 5 is a flowchart to help explain an inequality calculating process at the scientific electronic calculator 10.

FIG. 5 is a flowchart to help explain an inequality calculating process performed by the scientific electronic calculator 10.

Figure 6A:
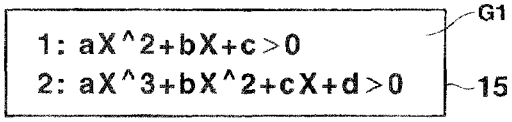
FIG. 6A shows an inequality select screen G1 displayed on a display unit 15 of the scientific electronic calculator 10.

FIG. 6A shows an inequality select screen G1 displayed on the display unit 15 of the scientific electronic calculator 10.

Figure 6B:
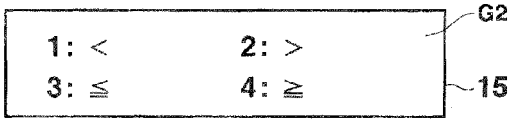
FIG. 6B shows an inequality select screen G2 displayed on the display unit 15 of the scientific electronic calculator 10.

FIG. 6B shows an inequality select screen G2 displayed on the display unit 15 of the scientific electronic calculator 10.

Figure 6C:
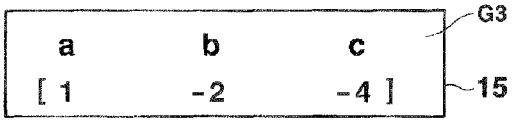
FIG. 6C shows a coefficient input screen G3 displayed on the display unit 15 of the scientific electronic calculator 10.

FIG. 6C shows a coefficient input screen G3 displayed on the display unit 15 of the scientific electronic calculator 10.

When the inequality computation mode is set according to the user operation at the key input unit 11, first, the inequality select screen G1 for the user to select either a quadratic inequality or a cubic inequality by number "1" or "2" is displayed on the display unit 15 as shown in FIG. 6A (step S1).

On the inequality select screen G1, when the user presses numeric key "1" of the key input unit 11, the quadratic inequality [$ax^2+bx+c>0$] is selected and data representing the quadratic inequality is stored as computation equation data 25a in the arithmetic working memory 25 (see FIG. 4) (step S1).

Next, as shown in FIG. 6B, the inequality select screen G2 for the user to select an inequality sign symbol from number "1" to number "4" is displayed on the display unit 15 (step S2).

On the inequality select screen G2, when the user presses numeric key "3" of the key input unit 11, [≤] is selected as an inequality sign symbol for the quadratic inequality [$ax^2+bx+c>0$] to perform an arithmetic operation this time. The data representing [≤] is stored as inequality sign symbol data 25b in the arithmetic working memory (see FIG. 4) (step S2).

Then, as shown in FIG. 6C, the coefficient input screen G3 for numerically inputting the coefficients a, b, c of the selected quadratic inequality [$ax^2+bx+c>0$] is displayed on the display unit 15 (step S3).

On the coefficient input screen G3, when the user inputs the coefficients a=1, b=−2, c=−4 with the numeric keys of the key input unit 11, these items of data are stored as coefficient data 25c in the arithmetic working memory 25 (see FIG. 4) (step S3).

After the above input, arithmetic processing is performed on the quadratic inequality [$x^2-2x-4\leq 0$] on the basis of the quadratic inequality data [$ax^2+bx+c$] 25a, inequality sign symbol data [≤] 25b, coefficient data [a=1, b=−2, c=−4] 25c stored in the arithmetic working memory 25, the values [X1=−1.236067977] [X2=3.236067977] of its solutions are determined, and the values are stored as solution data 25d in the arithmetic working memory 25 (see FIG. 4) (step S4).

Then, on the basis of the solution data [X1=−1.236067977] [X2=3.236067977] 25d, inequality sign symbol data [≤] 25b, and coefficient data [a=1, b=−2, c=−4] 25c stored in the arithmetic working memory 25 (see FIG. 4), notation pattern data [A≤X≤B] (see 22P of FIG. 3) is determined. The display pattern data is stored as inequality type data 25e in the arithmetic working memory 25 (step S5).

Then, the display mode data stored in the display mode data memory 26 is read and it is determined whether the mathematical natural display mode (Math I/O) or calculator display mode (Line I/O) has been set as the display mode of the calculation result (step S6).

Figure 7:
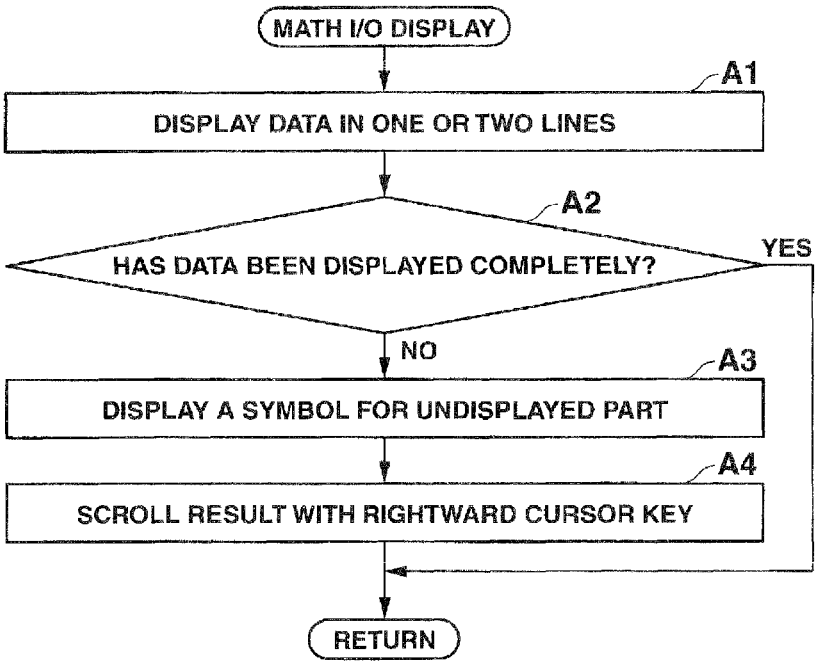
FIG. 7 is a flowchart to help explain a Math I/O display process involved in the inequality calculating process of the scientific electronic calculator 10.

If it has been determined that the mathematical natural display mode (Math I/O) has been set as the display mode, control is passed to a Math I/O display process of FIG. 7 (step SA).

FIG. 7 is a flowchart to help explain a Math I/O display process involved in the inequality calculating process of the scientific electronic calculator 10.

Figure 8:
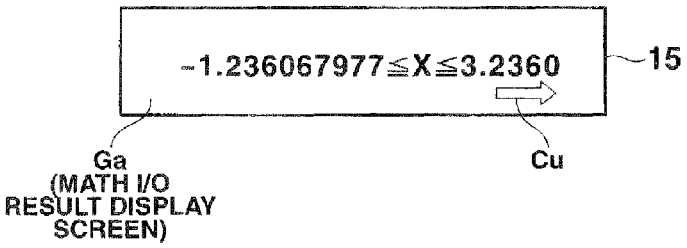
FIG. 8 shows a display screen Ga of the result of calculation in the Math I/O display process of the scientific electronic calculator 10.

FIG. 8 shows a display screen Ga of the result of calculation in the Math I/O display process of the scientific electronic calculator 10.

In the Math I/O display process, the solution data [X1=−1.236067977] [X2=3.236067977] 25d are substituted into the solution notation pattern data [A≤X≤B] stored as the inequality type data 25e in the arithmetic working memory 25, producing calculation result display data [−1.236067977≤X≤3.236067977], which is then displayed on the calculation result display screen Ga as shown in FIG. 8 (step A1). At this time, the calculation result of a quadratic inequality is displayed in one line and that of a cubic inequality is displayed in two lines.

On the calculation result display screen Ga, it is determined whether the calculation result [−1.236067977≤X≤3.236067977] has been displayed completely in one line (step A2).

As shown in FIG. 8, it has been determined that the calculation result has not been displayed completely in one line (No in step A2), an arrow symbol Cu indicating the direction in which there is an undisplayed part in the calculation result is displayed at the same time (step A3).

Then, when the right cursor key 14 is operated at the key input unit 11 according to the direction pointed by the arrow symbol Cu displayed on the calculation result display screen Ga, the calculation result [−1.236067977≤X≤3.236067977] displayed on the calculation result display screen Ga is scrolled so that the undisplayed part may be displayed sequentially (step A4).

Figure 9:
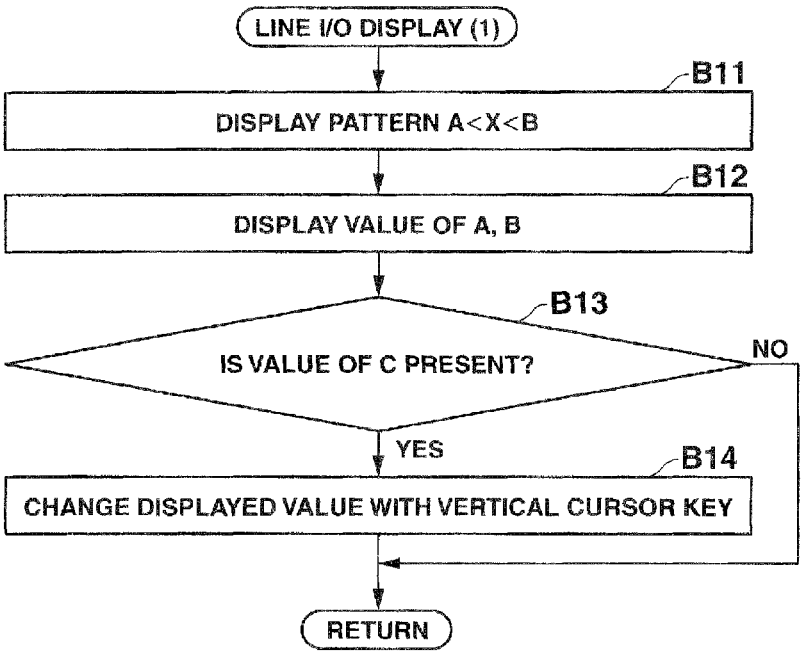
FIG. 9 is a flowchart to help explain a Line I/O display process [1] in the inequality calculating process of the scientific electronic calculator 10.
Figure 11:
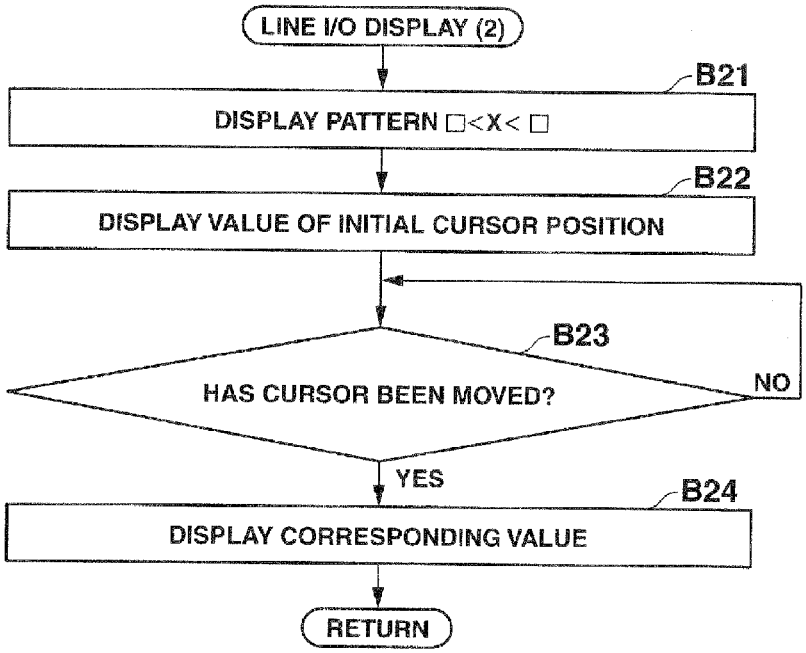
FIG. 11 is a flowchart to help explain a Line I/O display process [2] in the inequality calculating process of the scientific electronic calculator 10.

On the other hand, in step S6, if it has been determined that the calculator display mode (Line I/O) has been set as the display mode, control is passed to a Line I/O display process [1] of FIG. 9 or FIG. 11 (step SB).

FIG. 9 is a flowchart to help explain a Line I/O display process [1] in the inequality calculating process of the scientific electronic calculator 10.

Figure 10:
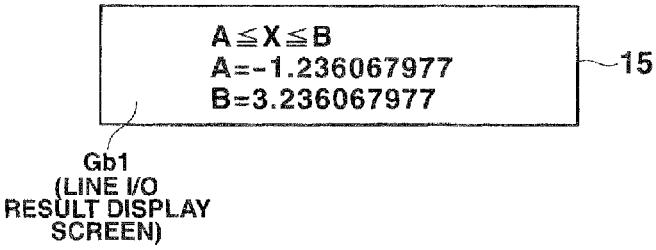
FIG. 10 shows a display screen Gb1 of the result of calculation in the Line I/O display process [1] of the scientific electronic calculator 10.

FIG. 10 shows a display screen Gb1 of the result of calculation in the Line I/O display process [1].

In the Line I/O display process [1], the solution notation pattern data [A≤X≤B] stored as the inequality type data 25e in the arithmetic working memory 25 is read and displayed as the display screen Gb1 in the upper part (or in a first row) of the display unit 15 as shown in FIG. 10 (step B11).

Then, the smaller one [X1=−1.236067977] of the solutions stored as the solution data 25d in the arithmetic working memory 25 is read as the value of [A] in [A≤X≤B] and displayed as [A=−1.236067977] in the middle (in a second row) of the display unit 15. Moreover, the greater one [X2=3.236067977] of the solutions stored as the solution data 25d in the arithmetic working memory 25 is read as the value of [B] and displayed as [B=3.236067977] in the lower part (in a third row) of the display unit 15 as shown in FIG. 10 (step B12).

Here, if, for example, a cubic inequality is calculated this time, since the value of X3 exists in the solution data 25d, it is determined that the value of [C] exists (Yes in step B13). According to the operation of the vertical cursor key 14 in the key input unit 11, the value is moved row by row in the display of [A] [B] and finally the value of [C] is displayed as [C= . . . ] (step B14).

In place of the Line I/O display process [1], the value may be displayed by a subsequent Line I/O display process [2].

FIG. 11 is a flowchart to help explain a Line I/O display process [2] in the inequality calculating process of the scientific electronic calculator 10.

Figure 12:
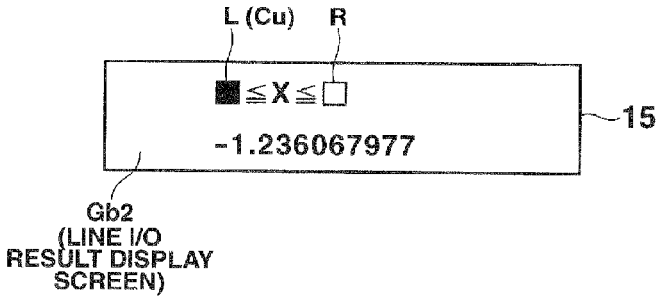
FIG. 12 shows a display screen Gb2 of the result of calculation in the Line I/O display process [2] of the scientific electronic calculator 10.

FIG. 12 shows a display screen Gb2 of the result of calculation in the Line I/O display process [2] of the scientific electronic calculator 10.

In the Line I/O display process [2], first, the solution notation pattern data [A≤X≤B] stored as the inequality type data 25e in the arithmetic working memory 25 is read. Then, display data [□≤X≤□] obtained by replacing the corresponding symbols [A] [B] in the solution with square symbols [□] L, [□] R, respectively is created and displayed as the calculation result display screen Gb2 in the upper part (a first row) of the display unit 15 as shown in FIG. 12 (step B21).

Then, the cursor (Cu) is displayed on the beginning (left) square symbol L in [□≤X≤□] displayed in the upper part (the first row) of the display unit 15. To display the corresponding value, the smaller one [X1=−1.236067977] of the solutions stored as the solution data 25d in the arithmetic working memory 25 is read. As shown in FIG. 12, only the value [−1.236067977] is displayed as the calculation result display screen Gb2 in the lower part (the third row) of the display unit 15 (step B22).

When the cursor (Cu) is moved to the next (right) square symbol R in [□≤X≤□] as a result of the operation of the lateral cursor key 14 in the key input unit 11 (Yes in step B23), the greater one [X2=3.236067927] of the solutions stored as the solution data 25d in the arithmetic working memory 25 is read as the value to be displayed. As shown in FIG. 12, the display is changed so that the value [3.236067977] may be displayed in the lower part (the third row) of the display unit 15.

As shown in FIGS. 11 and 12, in the Line I/O display process [2], the solution notation pattern data (display mode) [□≤X≤□] is displayed on the calculation result display screen Gb2 in the center of the upper part (the first row) of the display unit 15. Moreover, the value of the solution corresponding to the position of the cursor (Cu) is also displayed in the center of the lower part (the third row) of the display unit 15.

Figure 13:
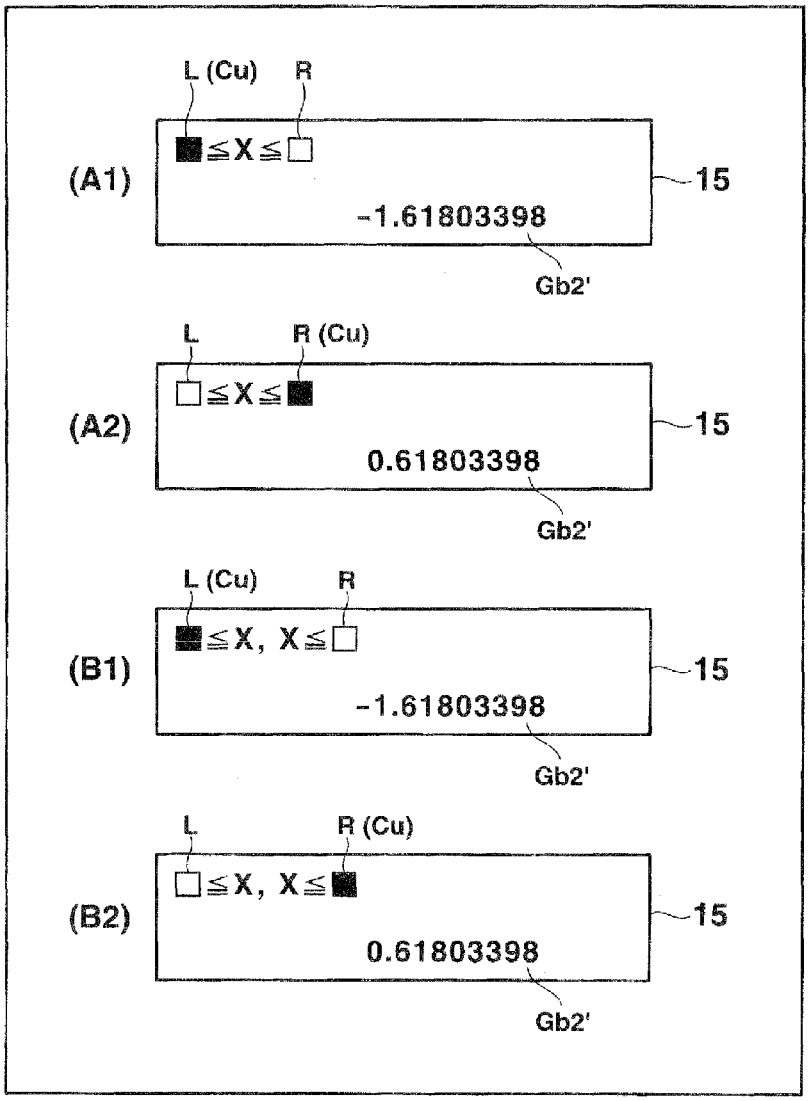
FIG. 13 shows an example of another display screen in the Line I/O display process [2] of the scientific electronic calculator 10.

In contrast, as shown in FIG. 13, on a calculation result display screen Gb2', the solution notation pattern data (display mode) [□≤X≤□] may be moved to the left end of the upper part (the first row) of the display unit 15 and the value of the solution corresponding to the position of the cursor (Cu) may be moved to the right end of the lower part (the third row) of the display unit 15. (A1) and (A2) in FIG. 13 show examples of the display of the solution notation pattern data (display mode) [□≤X≤□] at that time. (B1) and (B2) in FIG. 13 show examples of the display of the solution notation pattern data (display mode) [□≤X, X≤□].

The solution display method shown in FIG. 12 or 13 is particularly effective in an electronic calculator with a display unit whose upper part is composed of a dot matrix display and whose lower part is composed of a numeric 8-segment display. The displayed symbol is not restricted to a square and may be another symbol or character.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computing machine comprising:

inequality input means for inputting an inequality;

inequality computation means for calculating a solution to [an] *the* inequality input by the inequality input means;

solution notation pattern determination means which, on the basis of the solution to the inequality calculated by the inequality computation means and an inequality sign symbol of the inequality, determines a solution notation pattern [composed of a combination of] *including* a symbol and an inequality sign symbol; and solution display means which [causes] *displays on* a display [unit to display not only] *both* the solution notation pattern determined by the solution notation pattern determination means [but also the] *and a* value of the solution [of] the inequality calculated by the *inequality* computation means corresponding to the symbol included in the displayed solution notation pattern.

2. The computing machine according to claim 1, wherein the symbol [of] *included in* the solution notation pattern displayed by the solution display means is a character, and the solution display means displays on the display [unit] the value of [a] *the* solution corresponding to the character included in the notation pattern together with the character.

3. The computing machine according to claim 2, further comprising:

display mode setting means for setting a solution display mode to either a Line I/O mode or a Math I/O mode; and mathematical solution display means which, when the display mode setting means has set the Math I/O mode, displays on the display [unit] a solution notation obtained by substituting the value of the solution to the inequality calculated by the *inequality* computation means [into] *for* the symbol of the solution notation pattern determined by the notation pattern determination means, [instead of the operation of the solution display means]

*wherein, when the display mode setting means has set the Line I/O mode, the solution display means displays on the display both the solution notation pattern determined by the solution notation pattern determination means and the value of the solution to the inequality calculated by the inequality computation means corresponding to the symbol included in the displayed solution notation pattern.*

4. The computing machine according to claim 3, further comprising:

symbol display means which, when the mathematical solution display means has not displayed the solution notation fully on the display [unit], displays *a* scroll [symbols] *symbol* on the display [unit]; and scroll means which, when the symbol display means has displayed the scroll [symbols] *symbol* on the display [unit], scrolls the solution notation displayed on the display [unit] according to a user operation [and displays the resulting notation].

5. The computing machine according to claim 1, further comprising:

symbol specifying means for specifying, according to a user operation, a symbol corresponding to the solution in the solution notation pattern displayed by the [pattern] *solution* display means, wherein the solution display means [includes means for causing] *displays on* the display [unit to display] the value of the solution corresponding to the symbol of the solution notation pattern specified by the symbol specifying means.

6. The computing machine according to claim 5, further comprising:

display mode setting means for setting a solution display mode to either a Line I/O mode or a Math I/O mode; and mathematical solution display means which, when the display mode setting means has set the Math I/O mode, displays on the display [unit] a solution notation obtained by substituting the value of the solution to the inequality calculated by the *inequality* computation means [into] *for* the symbol of the solution notation pattern determined by the *solution* notation pattern determination means [instead of the operation of the solution display means],

*wherein, when the display mode setting means has set the Line I/O mode, the solution display means displays on the display both the solution notation pattern determined by the solution notation pattern determination means and the value of the solution to the inequality calculated by the inequality computation means corresponding to the symbol included in the displayed solution notation pattern.*

7. The computing machine according to claim 6, further comprising:

symbol display means which, when the mathematical solution display means has not [display] *displayed* the solution notation fully on the display [unit], displays *a* scroll [symbols] *symbol* on the display [unit]; and scroll means which, when the symbol display means has displayed the scroll [symbols] *symbol* on the display [unit], scrolls the solution notation displayed on the display [unit] according to a user operation [and displays the resulting notation].

8. A solution display method *executed* in a computing machine which performs an arithmetic operation on an input inequality, the solution display method comprising:

[a solution notation pattern determination step of] *determining*, on the basis of a *calculated* solution to the inequality [calculated and an inequality sign symbol of the inequality, determining] a solution notation pattern [composed of a combination of] *including* a symbol and [the] *an* inequality sign symbol; and

[a solution display step of causing] *displaying on* a display [unit to display not only] *both* the solution notation pattern [determined in the solution notation pattern determination step but also the] *and a* value of the *calculated* solution to the inequality corresponding to the symbol included in the displayed solution notation pattern.

9. The solution display method according to claim 8, wherein the symbol [of] *included in* the solution notation pattern displayed [in the solution display step] *on the display* is a character, and

[the solution display step includes a step of displaying on the display unit] the value of [a] *the* solution corresponding to the character included in the notation pattern *is displayed* together with the character.

10. The solution display method according to claim 9, further comprising:

[a display mode setting step of] setting a solution display mode to either a Line I/O mode or a Math I/O mode; and

[a mathematical solution display step of,] when the Math I/O mode has been set [In the display mode setting step], displaying on the display [unit] a solution notation obtained by substituting the value of the calculated solution to the inequality [into] *for* the symbol of the solution notation pattern [determined in the is notation pattern determination step, instead of the operation of the solution display step],

*wherein when the Line I/O mode has been set, the display displays both the solution notation pattern and the value of the solution to the inequality corresponding to the symbol included in the displayed solution notation pattern*.

11. The solution display method according to claim 10, further comprising:

[a symbol display step of,] when the solution notation has not been displayed fully on the display [unit in the mathematical solution display step] *when the Math I/O mode has been set*, displaying *a* scroll [symbols] *symbol* on the display [unit]; and

[a scroll step of,] when the scroll [symbols have] *symbol has* been displayed on the display [unit in the symbol display step], scrolling the solution notation displayed on the display [unit] according to a user operation.

12. The solution display method according to claim [8] *22*, further comprising:

[a symbol specifying step of] specifying, according to a user operation, a symbol corresponding to the solution in the solution notation pattern displayed [in the pattern display step] *on the display*, wherein [the solution display step includes a step of causing] the display [unit to display] *displays* the value of the solution corresponding to the *specified* symbol of the solution notation pattern [specified in the symbol specifying step].

13. The solution display method according to claim 12, further comprising:

[a display mode setting step of] setting a solution display mode to either a Line I/O mode or a Math I/O mode; and

[a mathematical solution display step of,] when the Math I/O mode has been set [in the display mode setting step], displaying on the display [unit] a solution notation obtained by substituting the value of the calculated solution to the inequality [into] *for* the symbol of the solution notation pattern [determined in the notation pattern determination step, instead of the operation of the solution display step],

*wherein when the Line I/O mode has been set, the display displays both the solution notation pattern and the value of the solution to the inequality corresponding to the symbol included in the displayed solution notation pattern*.

14. The solution display method according to claim 13, further comprising:

[a symbol display step of,] when the solution notation has not been displayed fully on the display [unit in the mathematical solution display step] *when the Math I/O mode has been set*, displaying *a* scroll [symbols] *symbol* on the display [unit]; and

[a scroll step of,] when the scroll [symbols have] *symbol has* been displayed on the display [unit in the symbol display step], scrolling the solution notation displayed on the display [unit] according to a user operation.

15. A computing machine comprising*:* a key input unit[,]*;* a display [unit,]*;* a processor[,]*;* and a memory,

*wherein* the processor [including an inequality input function of causing the key input unit to input an inequality, an inequality computation function of calculating] *is configured to:* (*i*) *calcuate* a solution to an inequality input [by the inequality input function, a solution notation pattern determination function of,] *via the key input unit;* (*ii*) on the basis of the solution to the inequality [calculated by the inequality computation function] and an inequality sign symbol of the inequality, [determining] *determine* a solution notation pattern [composed of a combination of] *including* a symbol and an inequality sign symbol; and

[a solution display function of causing a] (*iii*) *cause the* display [unit] to display [not only] *both* the solution notation pattern [determined by the solution notation pattern determination function but also the] *and a* value of the *calculated* solution to the inequality [calculated by the computation function] corresponding to the symbol included in the displayed solution notation pattern.

16. The computing machine according to claim 15, wherein the symbol [of] *included in* the solution notation pattern displayed [by the solution display function] *on the display* is a character, and

[the solution display function has the function of displaying on] *the processor causes* the display [unit] *to display* the value of [a] *the* solution corresponding to the character included in the notation pattern together with the character.

17. The computing machine according to claim 16, wherein the memory [includes a display mode storage unit which] stores data that sets a solution display mode to either a Line I/O mode or a Math I/O mode[; and],

*wherein* the processor [executes a mathematical solution display function of] *is configured to*, when the [display mode storage unit] *memory* has stored data that sets the Math I/O mode, [displaying on] *cause* the display [unit] *to display* a solution notation obtained by substituting the value of the *calculated* solution to the inequality [calculated by the computation function into] *for* the symbol of the solution notation pattern [determined by the notation pattern determination function, instead of the operation of the solution display function], *and*

*wherein the processor is configured to, when the memory has stored data that sets the Line I/O mode, cause the display to display both the solution notation pattern and the value of the calculated solution to the inequality corresponding to the symbol included in the displayed solution notation pattern.*

18. The computing machine according to claim [15] *22*, wherein the processor [executes a symbol specifying function of specifying] *is configured to specify*, according to a user operation, a symbol corresponding to the solution in the solution notation pattern displayed [by the pattern display function] *on the display*, and

[the solution display function includes the function of causing] *wherein the processor is configured to cause* the display [unit] to display the value of the solution corresponding to the *specified* symbol of the solution notation pattern [specified by the symbol specifying function].

19. The computing machine according to claim 18, wherein the memory [includes a display mode storage unit which] stores data that sets a solution display mode to either a Line I/O mode or a Math I/O mode, [and]

*wherein* the processor [executes a mathematical solution display function of] *is configured to execute*, when the [display mode storage unit] *memory* has stored data that sets the Math I/O mode, [displaying on] *cause* the display [unit] *to display* a solution notation obtained by substituting the value of the *calculated* solution to the inequality [calculated by the computation function into] *for* the symbol of the solution notation pattern [determined by the notation pattern determination function, instead of the operation of the solution display function], *and*

*wherein the processor is configured to, when the memory has stored data that sets the Line I/O mode, cause the display to display both the solution notation pattern and the value of the calculated solution to the inequality corresponding to the symbol included in the displayed solution notation pattern.*

*20. The computing machine according to claim 1, wherein the solution notation pattern includes a plurality of symbols and a plurality of inequality sign symbols; and*

*wherein the solution display means displays, on the display, both the solution notation pattern and the value of the solution to the inequality corresponding to at least one of the plurality of symbols included in the displayed solution notation pattern.*

*21. The solution display method according to claim 8, wherein the solution notation pattern includes a plurality of symbols and a plurality of inequality sign symbols; and*

*wherein the display displays both the solution notation pattern and the value of the solution to the inequality corresponding to at least one of the plurality of symbols included in the displayed solution notation pattern.*

*22. The computing machine according to claim 15, wherein the solution notation pattern includes a plurality of symbols and a plurality of inequality sign symbols; and*

*wherein the processor is configured to cause the display to display both the solution notation pattern and the value of the solution to the inequality corresponding to at least one of the plurality of symbols included in the displayed solution notation pattern.*

* * * * *